United States Patent [19]

Suominen

[11] Patent Number: 5,033,928
[45] Date of Patent: Jul. 23, 1991

[54] METHOD AND TRANSFER VEHICLE TO ELIMINATE THE ACCUMULATION OF ERRORS OCCURING IN THE PLACING OF PACKAGES IN A CONSECUTIVE STORE

[76] Inventor: Seppo K. Suominen, 76850, Naarajarvi, Finland

[21] Appl. No.: 326,550
[22] PCT Filed: Sep. 7, 1987
[86] PCT No.: PCT/FI87/00120
 § 371 Date: Mar. 9, 1989
 § 102(e) Date: Mar. 9, 1989
[87] PCT Pub. No.: WO88/01975
 PCT Pub. Date: Mar. 24, 1988

[30] Foreign Application Priority Data

Sep. 10, 1986 [FI] Finland .................................. 863634
Jul. 28, 1987 [FI] Finland .................................. 873277

[51] Int. Cl.$^5$ .................................................. B65G 1/00
[52] U.S. Cl. ........................................ 414/277; 414/279; 414/495
[58] Field of Search ............... 414/498, 495, 277, 279; 108/53.3, 55.1

[56] References Cited

U.S. PATENT DOCUMENTS

| | | | |
|---|---|---|---|
| 3,357,582 | 12/1967 | Wittek | 414/495 |
| 3,647,014 | 3/1972 | Wilke et al. | 414/498 X |
| 3,800,963 | 4/1974 | Holland | 414/279 |
| 3,809,268 | 5/1974 | Lutz | 414/495 X |
| 4,042,127 | 8/1977 | Brossia | 108/51.3 X |
| 4,637,770 | 1/1987 | Swadell | 414/495 |

FOREIGN PATENT DOCUMENTS 7938352 5/1980 United Kingdom ................ 414/275

Primary Examiner—Joseph E. Valenza
Assistant Examiner—Keith L. Dixon
Attorney, Agent, or Firm—Jones, Askew & Lunsford

[57] ABSTRACT

A method and transfer vehicle for the elimination of the accumulation of positioning errors of packages in storage places in a computer controlled consecutive store, where the packages are stored consecutively on the base of the rails on which the transfer vehicle travels and where in order to move a package in the center the packages in front or behind must first be removed. The transfer vehicle includes a lifting device which lifts the package off of the base and onto the transfer vehicle for transport. Known store transfer vehicles of this type cause a detrimental accumulation of errors during the positioning of the packages. According to the invention, a package is centered in the direction of the store line relative to the transfer vehicle at least once during the time it is stored on the store line. This takes place most advantageously in connection with each lift via the lifting device.

8 Claims, 6 Drawing Sheets

METHOD AND TRANSFER VEHICLE TO ELIMINATE THE ACCUMULATION OF ERRORS OCCURING IN THE PLACING OF PACKAGES IN A CONSECUTIVE STORE

The object of this inventiion is a method of eliminating the accumulation of errors in the placing of packages in a computer-controlled consecutive store, in which method the packages in the store are stored consecutively on a base on top of the rails of the transfer vehicle and in which in order to remove a package in the centre the packages in front of it must first be moved out of the way, and in which the transfer vehicle includes a lifting device, which lifts the package to be moved onto the transfer vehicle ready for transportation. The invention is also concerned with the realization of the method in the transfer vehicle.

Finnish Patent Application No. 842409 and Patent No. 47559 show some kinds of consecutive stores, in which the packages are stored consecutively on top of rails and in which the transfer vehicle that travels freely beneath the rails includes a lifting device to take a package onto the vehicle for transportation. The system includes placing devices that control the placing of the packages onto the desired position on the store line. In the first-mentioned application this is realized with the aid of a computer and a pulse-sensor device connected to it. In this the accuracy of the placing is even of the order of 1 mm. despite this the inaccuracy of the placing becomes significant in certain cases. Principally this applies to such stores in which there are at least two store lines and transfer lines connecting them, which makes the automatic circulation of packages possible. If certain packages are stored for long times on such store lines from which there are otherwise many collections these long-term storage packages must be moved and circulated even hundreds of times. The known transfer vehicles in this kind of store cause the accumulation of an error in placing. In practice this leads to the situation in which the position of the package begins to gradually slip away from the calculated position on the store line and finally incorrect operation arises because of this when the transfer vehicle places itself at a significantly different position to that of the package to be lifted. The problem thus arises from the multiplication of a small error many times in the same direction. Generally this small errors takes place when the transfer vehicle lifts the package off the rails when it is not placed accurately in the centre of the vehicle. In practice the error has been observed to arise when the transfer vehicle arrives at the place of the package to be lifted always from the same direction.

By means of the invention it is attempted to eliminated the accumulation of the previous depicted error in the placing of a package. A centering on the store line carried out once is not always sufficient, if the store line is so long that in through circulation the package may exceed the placing tolerance area. In this the transfer vehicle carries out the centering of the package in connection with each lift. First of all this has the advantage that the centering measure required is quite small. Secondly the combination of centering with the operation of the lifting device is advantageous because the system does not then demand external control for centering. In the disclosed embodiment, these the correction movement is carried out in connection with each lift and the position of the package is corrected immediately if it has moved a predetermined amount from its calculated position, that is if it is outside of the area of tolerance. The centering devices shown in FIGS. 3-6 are especially advantageous for the reason that only the very small force of the sensor is directed onto the package, for the sensor being a freely turning switching device it can be turned out of the road of the sliding device. In the case of weak packages, for example wooden platform, this is important as they may not necessarily withstand shifting taking place from the edge of the platform.

In what follows the invention is illustrated by reference to the accompanying illustrations, which show some of the forms of application of the invention.

Figure 1:
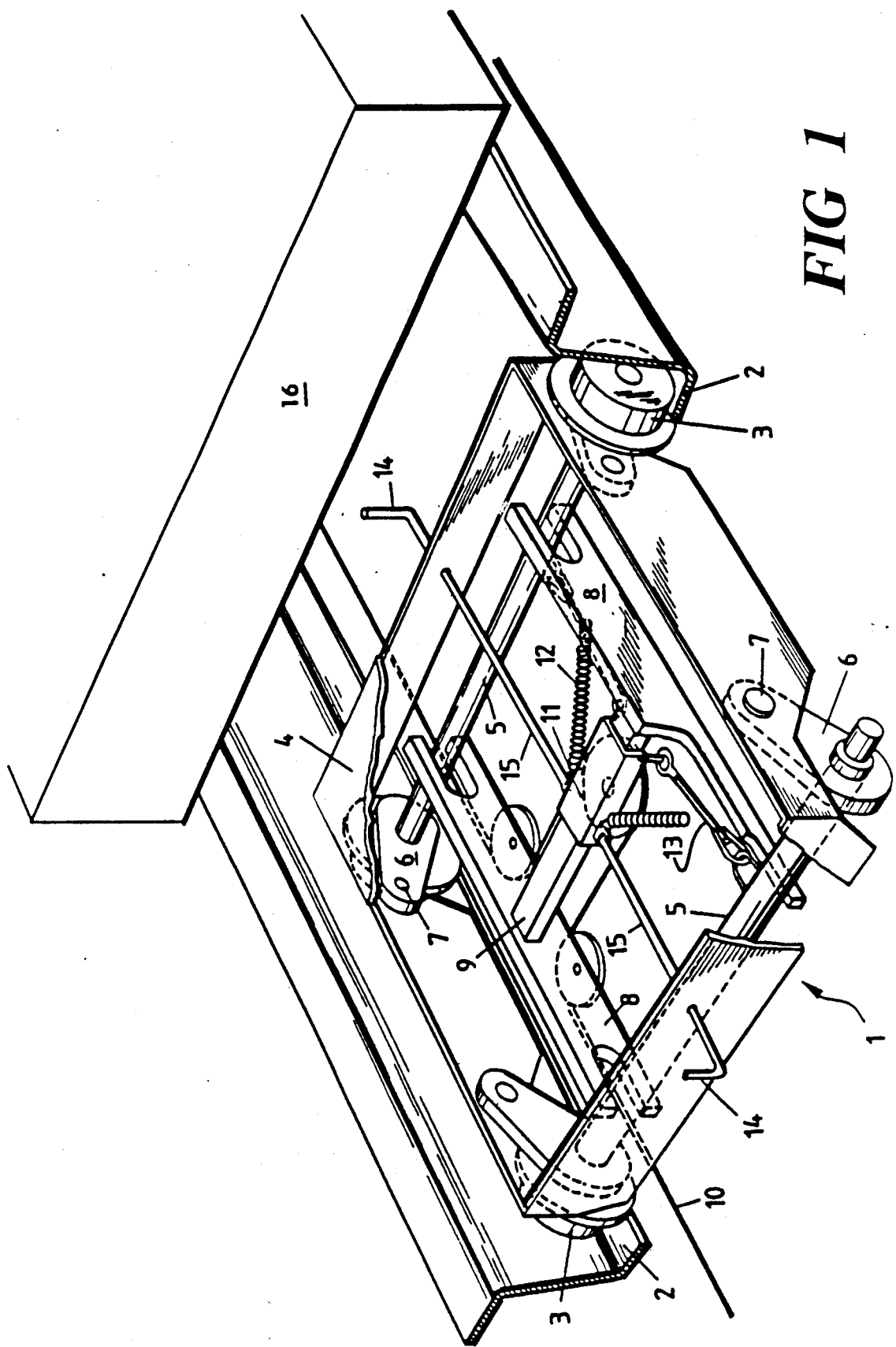
FIG. 1 shows one kind of transfer vehicle in partial cross-section.

Transfer vehicle 1 travels with its wheel 3 supported on rails 2 FIG. 1. The upper part of the rails 2 forms the storage base of the packages 16. The transfer vehicle 1 is pulled along the store line by means of cable devices. In the transfer vehicle 1 the principal components are the upper frame 4, the axles 5 that are jointed to it by means of the support arms 6, the underframe 8 and the lifting device cable wheel machinery that is installed on it. The upper frame 4 itself forms the lifting device in such a way that the lifting mechanism pulls the axles 5 together, when the support arms 6 lift the upper frame 4 and its surface plate froms the lifting surface.

The lifting mechanism includes the sliding device 11 fitted to the underframe 8, and to which one cable wheel is attached to turn, and which can if required be pulled along the frame beams 9 by tightening the cable 10. The springs 12 retain the sliding device 11 in the resting position at one end of beam 9 and the pull of cable 10 moves it to the other end. The lever arms 13, which pulls the axles 5 inwards when the sliding device 11 moves along beam 9, when they lift the upper frame 4 carried by support arms set at an angle and this in turn lifts the desired package clear of the rails, are placed between the sliding device 11 and the axles 5.

The centering devices are formed by the pins 14, which are also connected by means of the levers 15 to the sliding device 11. The holes at the front and rear plates of the uper frame 4 act as guides for the levers 15. The upper end of the pins 14 is at the height of the surface plate of the upper frame 4 when this is in the lower position. On account of the transverse movement of the sliding device 11 and the rise of the upper frame 4 the centering pins 14 rise above the lifting surface of the upper frame 4 and move towards one another. One of the pins takes hold of the wrongly positioned package and moves it more to the centre of the transfer vehicle. When a heavy package is raised the transfer vehicle 1 moves itself in the direction of the package as the transfer cable and the rest of the construction gives way. When the package is lifted clear of the rails the transfer vehicle returns to the correct position.

Figure 2:
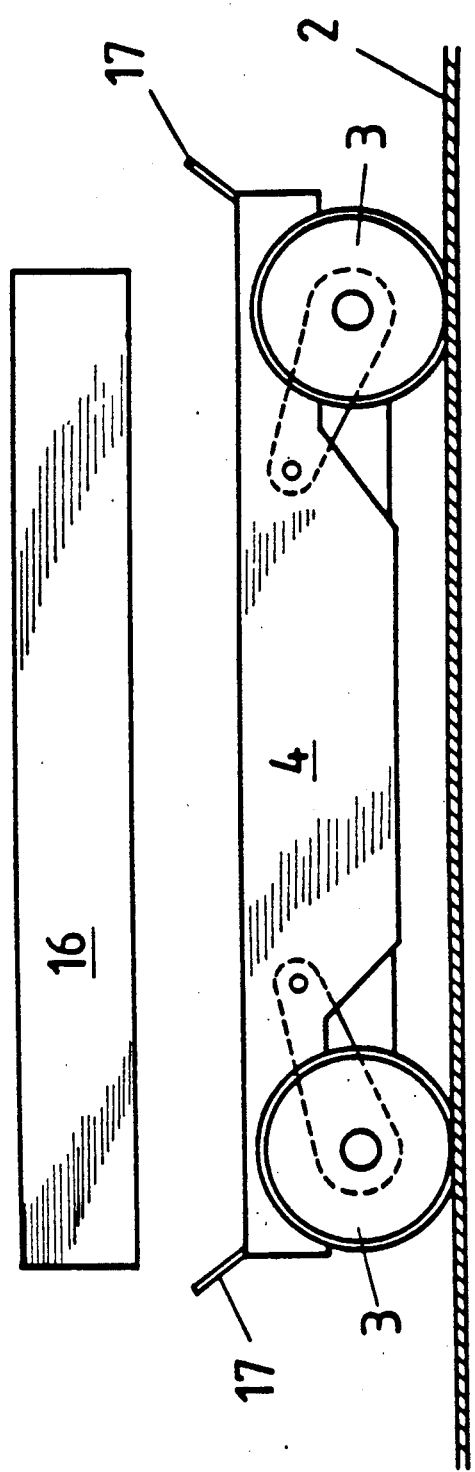
FIG. 2 shows a second kind of transfer vehicle in side view.

FIG. 2 shows another form of application of the transfer device. In this centering is carried out by the sloping surfaces 17 that form the upper frame 4. In this the package 16 is shown slightly to the side of the calculated storage position. In this centering takes place when the sloping surface 17 takes hold of the lower corner of the package 16. As a result of this the package 16 moves more to the centre or as in the case of the previous transfer vehicle 1 the positioning devices give way slightly and the transfer vehicle 1 moves more exactly under the package and when the package rises clear of the base the vehicle positions itself in the correct position.

Figure 3:
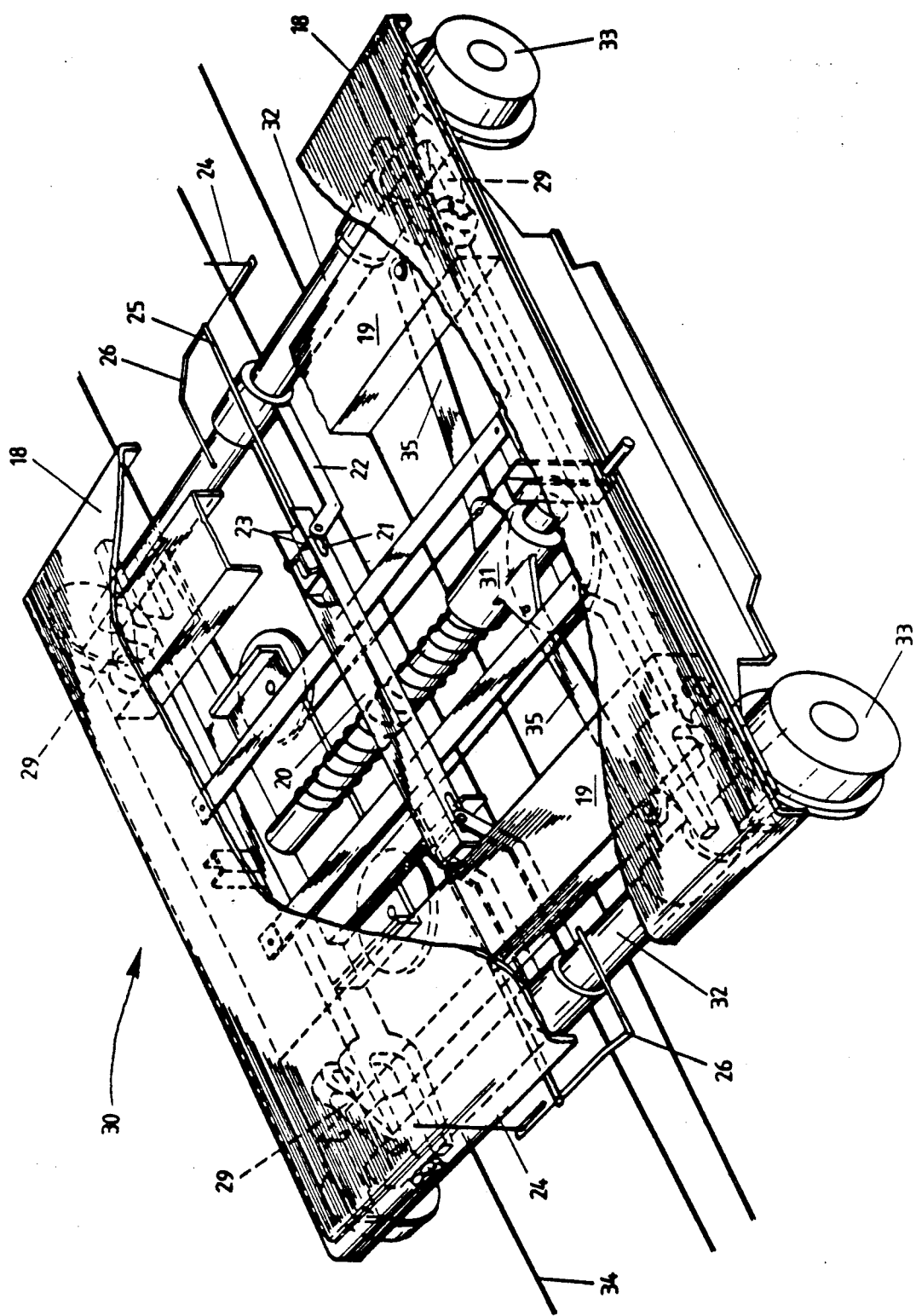
FIG. 3 shows a third kind of transfer vehicle in partial cross-section

The basic construction and operation of the transfer vehicle shown in FIG. 3 are of the same kind as those of the transfer vehicle in FIG. 1. The transfer vehicle 30 includes four wheels 33 running on bearing on axles 32. The frame part 19 is carried on the axles by means of the jointed arms 29. The principal sliding device 31 is made to move by means of a cable mechanism using the cable 34, when the axles 32 are made to move inwards by means of the lever arms 35. The lifting cover 18 is able to move limitedly on top of the frame part 19. The movement of the lifting cover 18 is determined by beam 20 and the centering devices connected to it. In FIG. 3 the transfer vehicle 30 is shown in the lower position, when the centering devices 24 at its ends are not operating but are turned to the lower position by means of the counter levers 29 supporting the axles 32. The sliding device 23 is formed of a bar secured to the rod 22, and which is norally free to move along the slot 21 in the beam 20.

Figure 4:
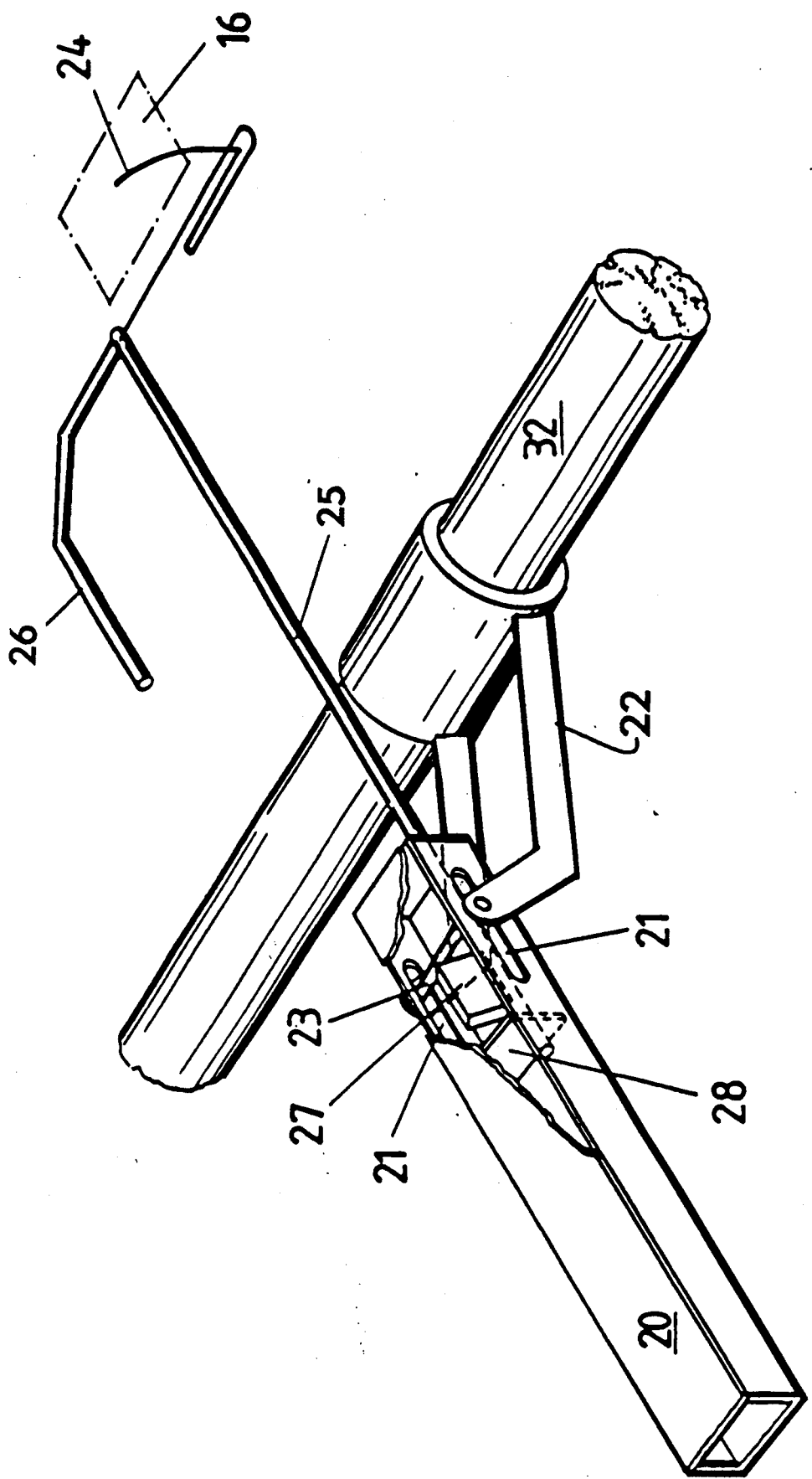
FIG. 4 shows the centering device of the transfer vehicle in FIG. 3 in detail.

In FIG. 4 the centering mechanism is shown in detail in such a case in which the lifting cover is raised and the wrongly positioned package 16 has pushed the sensor 24 downwards. In a normal case the counter lever 26 pushes the sensor 24 up from besides the edge of the package. The lever 25 connected to the counter lever 26 and the sensor 24 turns the selector 27 out of the road of the slider 23, which is then completely free to travel along the slot 21. The lifting cover 18 then remains in place through friction for the duration of the lift. In FIG. 4 the wrongly positioned package 16 does not allow the sensor 24 to rise in which case the switch device 27 remains in the road of the slider 23. The slider then presses against the switch device 27, which in turn presses against the catch 28 in beam 20 and the entire cover surface 18 with the package moves a small distance in the opposite direction to the deviation. It is essential that the components of the centering device are dimensioned in such a way that the push of the cover surface 18 takes place only after package 16 has been lifted clear.

Figure 5:
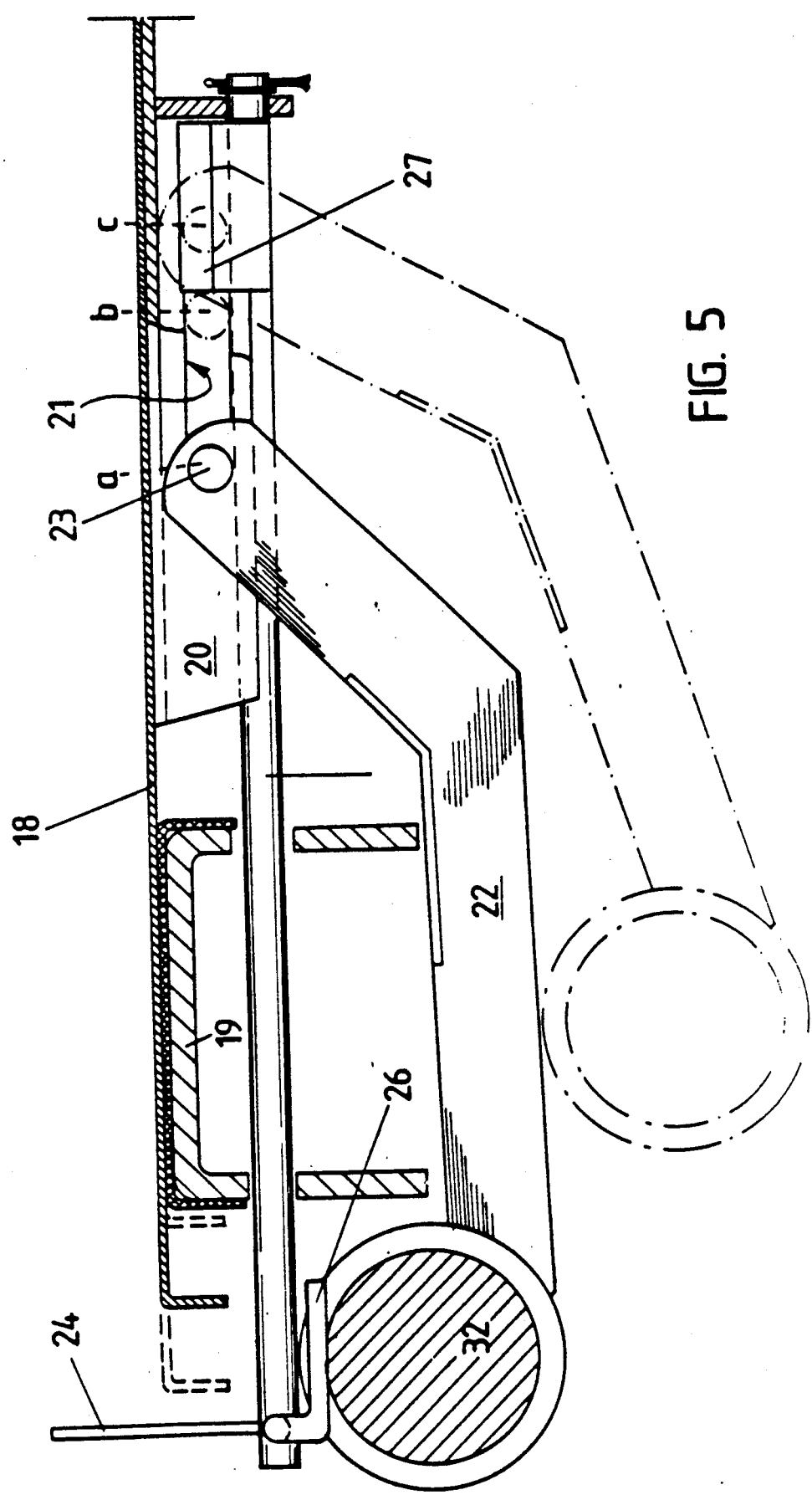
FIG. 5 shows the operation of the centering device of the transfer vehicle in FIG. 3.

In FIG. 5 the centering mechanism is shown from the side with the cover surface 18 in the lowered position. The cover surface 18 itself is free to move on top of the frame part 19, which for this purpose is surface to reduce friction. In addition the position of the slider 23 is shown in various stages of the lift. A transverse beam is shown of the frame 19 of the transfer vehicle 30, on top of which the cover surface 18 is able to slide for a short distance both backwards and forwards. The extreme positions of the cover surface are shown by broken lines. The sliding device 23 slides longitudinally along the slot 21 of the beam 20, and it is fastened to the arm device 22 secured to the axle 32.

In the starting position shown in FIG. 5 the selector 27 is still in the line of travel of sliding device 23, but when the lifting surface 18 rises the counter lever 26 of the sliding device 24 moves downwards, when bar 25 turns and the selector 27 moves out of the road of slider 23. In FIG. 5 position b of the sliding device 23 corresponds to a situation in which package 16 is already lifted off the base. After this the sliding device 23 moves along slot 21 on top of the switch device 27. If, however, package 16 is positioned on top of sensor 24, this cannot rise. Switch device 27 remains in place as shown in FIG. 5 and the sliding device 23 pushes it and in turn the catch 28 for a short distance. Movement takes place in a direction opposite to the deviation in positioning. When package 16 is lowered and lifting surface 18 has fallen to the lowered position slider 23 returns along slot 21 to the starting position. It then reaches the bottom of slot 21 before reaching its extreme position and pulls the lifting surface 18 back to the central position.

Figure 6:
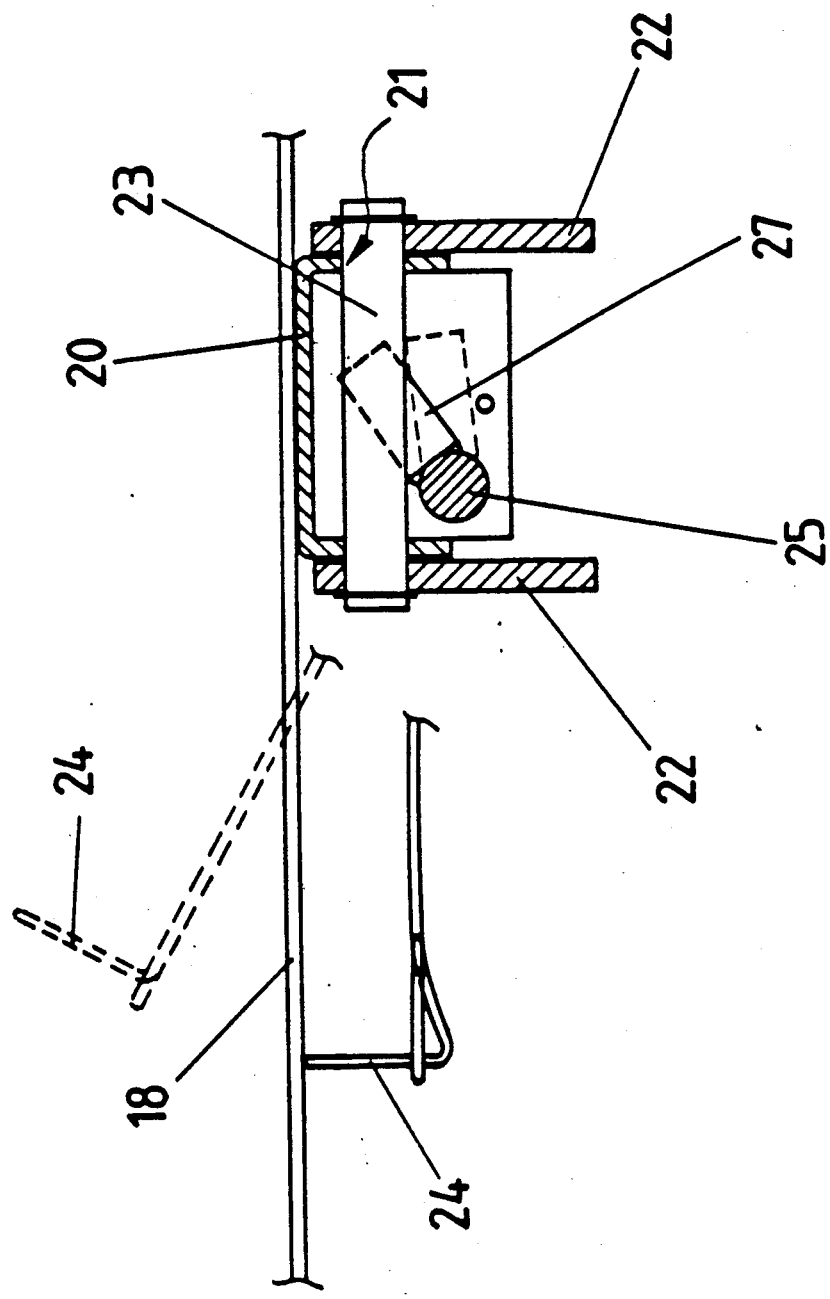
FIG. 6 shows the operation of the sensor.

In FIG. 6 the operation of the sensor and centering devices operation is shown from the front. In FIG. 6 the situation in which a package pushed the sensor 24 to the level of the lifting surfaces 18 is shown by a continuous line. The selector 27 connected to it is then in the line of travel of slider 23. In the situation shown by broken lines the sensor 24 is able to rise to the side of the package, when the switch device 27 remains beneath the line of travel of the sliding device 23.

By a single lift, package 16 moves to a more central position by typically about 2 cm., so that the correction of a large error in positioning requires a number of lifts. In any event the system prevents the accumulation of the error. This naturally presupposes accuracy and repeatability in the positioning of the transfer vehicle itself, which can be achieved by the aforementioned known means.

I claim:

1. A method for eliminating the accumulation of errors in the placing of packages in storage places in a computer-controlled consecutive store line, wherein the packages are stored consecutively on a base on top of rails for a transfer vehicle and in which, in order to remove a package in the middle of the store line, the packages in front of or behind it must first be moved out of the way, and in which the transfer vehicle includes a centering means for centering the packages relative to the transfer vehicle and a lifting device which lifts a selected package up from the base and onto the transfer vehicle for transportation, comprising the step of moving the package by said centering means in a selected first or second direction of the store line in relation to the transfer vehicle in connection with each lift, the direction of movement of the packages determined by the direction of accumulated errors in the placement of packages along the rails in response to operation of the lifting device of the transfer vehicle, thereby tending to center the package with respect to the location of the transfer vehicle.

2. A transfer vehicle travelling on rails of a store line wherein the packages are stored consecutively on a base on the rails and in which, in order to remove a package in the middle of the store line, the packages in front of or behind it must first be moved out of the way, and wherein the transfer vehicle includes a cable-operated package lifting device on which the package on the base is lifted, and the lifting device of the transfer device is arranged so that in a lowered position the lifting device moves under packages stored on the base, and the lifting device including a sliding device arranged to be moved by the movement of a cable, and wherein the movement of the cable is transmitted to the lifting device by means of lever means, the transfer vehicle eliminating the accumulation of errors in the placement of packages along the rails and comprising:

centering elements placed at front and back ends of the transfer vehicle in position to engage a package positioned outside a certain tolerance zone relative to the location of the transfer vehicle, and means operatively connecting the centering devices to the sliding device so that the centering elements move towards one another and center the package to be lifted with respect to the tolerance zone, in response to movement of the lifting device to a raised position.

3. A transfer vehicle travelling on rails forming a storage base for packages, the transfer vehicle comprising:

a lifting surface on which a package placed on the base is lifted, the transfer vehicle with the lifting surface in a lowered position being operative to move beneath the packages stored on the base;

means operative to raise the lifting surface vertically in response to the pull of a cable to lift a package from the base and to carry the package during transportation by the transfer vehicle;

a frame;

means supporting the lifting surface relative to the frame so that the lifting surface is free to move to a limited extent longitudinally on top of the frame;

first and second sliding means responsive to the pull of the cable to selectively move the lifting surface longitudinally in a respective first or second direction relative to a centered position of the lifting surface;

a sensor located in relation to each of first and second longitudinal ends of the lifting surface to sense when a package being lifted is positioned outside a certain tolerance area;

a selector responsive to each sensor and operative to engage the respective sliding means for moving the lifting surface longitudinally, after the lifting surface lifts the package off the base, in the direction tending to reposition the package to the tolerance area; and means operative to recenter the lifting surface after the package has been lowered to the base, so as to eliminate the accumulation of errors in the placing of packages at storage places on the base.

4. A transfer vehicle according to claim 3, wherein the vehicle comprises:

a pair of front wheels and a pair of rear wheels, the wheels of each such pair being connected to one another by common axles, the axles being operatively associated with the cable to move toward each other in response to the pull of the cable;

pivoted arms carrying the frame on the axles in operative relation to pivot upwardly and create a lifting movement as the axles move toward each other.

both sliding means comprised by a longitudinal beam attached to the lifting surface and having a pair of longitudinal slots;

a transverse bar movably disposed in each slot for selective engagement by the selector;

means linking each transverse bar with a corresponding one of the axles so as to move the transverse bar in the respective slot whenever the axles move toward each other; and each sensor extends from the lifting surface in such a way that a package placed outside the tolerance area engages the sensor to move the selector into position for engagement by the transverse bar moving in the slot, so that the movement of the respective transverse bar is transmitted through the selector to the longitudinal beam, thereby imparting the longitudinal movement to the beam and to the lifting surface.

5. A transfer vehicle as in claim 4, wherein:

each transverse bar is operatively associated with the corresponding slot to engage an end of the slot and longitudinally move the lifting surface back to the centered position after the package has been lowered to the base when the axles move away from each other to return to maximum separation after the lifting surface has moved in the opposite direction to correct misplacement of the packages.

6. A method for eliminating the accumulation of errors in the placing of packages in storage places in a consecutive storage line wherein the packages are stored consecutively on a base on top of rails for a transfer vehicle an in which, in order to remove a package in the middle, the packages in front of or behind it must first be longitudinally transferred out of the way, and in which the transfer vehicle includes a lifting device which lifts a package up from the base and onto the transfer vehicle for transportation and a lifting surface selectably longitudinally movable in either a forward or backward direction relative to the transfer vehicle, comprising the steps of:

sensing when a package is longitudinally positioned on the base outside a certain tolerance area relative to the lifting surface of the transfer vehicle in connection with each lift; and moving the lifting surface longitudinally in the direction tending to center the sensed package in the tolerance area in response to operation of the lifting mechanism of the transfer vehicle.

7. The method as in claim 6, wherein the step of moving the lifting surface to move the sensed package relative to the tolerance area takes place after the package is lifted off the base by the lifting surface of the transfer vehicle.

8. A method for eliminating the accumulation of errors in the placing of packages in storage places in a computer-controlled consecutive store line, wherein the packages are stored consecutively on a base on top of rails for a transfer vehicle and in which, in order to remove a package in the middle, the packages in front of or behind it must first be moved out of the way, and in which the transfer vehicle includes a centering means for centering the packages relative to the transfer vehicle a lifting device which lifts a selected package up from the base and onto the transfer vehicle for transportation and which is selectably shiftable in the direction of the sotre line relative to the position of the transfer vehicle on the rails, comprising the step of shifting the package in a selected first or second direction by said centering means to correct an erroneous position of the package on the store line in relation to the transfer vechicle in connection with a lift by means of the lifting device of the transfer vehicle, thereby tending to center the package with respect to the location of the transfer vehicle on the rails.

* * * * *